United States Patent [19]

Mascia et al.

[11] Patent Number: 5,270,115
[45] Date of Patent: Dec. 14, 1993

[54] REVERSIBLE POLYMER GELS BASED ON FLUOROELASTOMERS

[75] Inventors: Liberato Mascia, Loughborough, Great Britain; Giovanni Moggi, Milan, Italy

[73] Assignee: Ausimont S.p.A., Milan, Italy

[21] Appl. No.: 42,479

[22] Filed: Apr. 2, 1993

Related U.S. Application Data

[62] Division of Ser. No. 767,121, Sep. 27, 1991, Pat. No. 5,219,661.

[30] Foreign Application Priority Data

Oct. 1, 1990 [IT] Italy .................... 21612 A/90

[51] Int. Cl.$^5$ .................... C08L 27/08; B32B 15/08; B32B 27/04
[52] U.S. Cl. .................... 428/422; 428/290; 525/199; 525/197; 524/520
[58] Field of Search .................... 525/199; 428/422, 290; 524/520

[56] References Cited

U.S. PATENT DOCUMENTS

| | | | |
|---|---|---|---|
| 3,324,069 | 6/1967 | Koblitz et al. | 260/31.4 |
| 3,864,228 | 2/1975 | Rossetti et al. | 525/199 |
| 4,094,949 | 6/1978 | Yokokawa et al. | 264/234 |
| 4,400,487 | 8/1983 | Stoneberg et al. | 525/199 |
| 4,530,970 | 7/1985 | Morozumi et al. | 525/199 |
| 4,557,977 | 2/1985 | Memmer et al. | 525/199 |
| 4,590,227 | 5/1986 | Nakamura et al. | 525/199 |
| 4,764,431 | 8/1988 | Piacenti et al. | 428/540 |
| 4,935,467 | 6/1990 | Cheng et al. | 525/199 |
| 5,008,340 | 4/1991 | Guerra et al. | 525/199 |
| 5,081,175 | 1/1992 | Yagi et al. | 525/199 |

OTHER PUBLICATIONS

Enc. of Poly. Sci. & Eng., vol. 7 pp. 514-516 (2nd Ed. 1987).
Van Nostrand Reinhold Enc. of Chemistry pp. 272-276 (4th Ed. 1984).

Primary Examiner—Carman J. Seccuro, Jr.
Attorney, Agent, or Firm—Bryan Cave

[57] ABSTRACT

Reversible polymer gels comprising:
(a) 55-98% by weight based on the total polymers contained in the gel, of an elastomeric copolymer of vinylidene fluoride comprising, in moles, 55-85% of vinylidene fluoride, 15-45% of hexafluoropropene and 0.30% of tetrafluoroethylene;
(b) 2-45% based on the total polymers contained in the gel, of a non-elastomeric polymer selected from non-elastomeric VDF. based polymers, or polyvinylfluoride, or acrylic resins, for example polyalkylmethacrylates and copolymers of alkylmethacrylates with alkylacrylates, having $T_g > 50°$ C.

Said polymer gels can be used as protective and consolidating agents for stone materials, for preparing insulating and impermeable films and for impregnating fiber textiles 8 Claims, No Drawings

REVERSIBLE POLYMER GELS BASED ON FLUOROELASTOMERS

This is a division of U.S. application Ser. No. 07/767,121, filed Sep. 27, 1991 now U.S. Pat. No. 5,219,661.

FIELD OF THE INVENTION

The present invention relates to polymer gels based on fluoroelastomers.

More particularly, the present invention concerns a reversible polymer gel of fluoroelastomers based on copolymers of vinylidene fluoride, which can be used in particular for stone-protection and consolidation.

BACKGROUND OF THE INVENTION

As known, the decay of building materials (marble, sandstone, bricks, etc.) and of decorative and artistic articles manufactured from these materials is determined by various phenomena both physical and chemical in nature which mainly occur in the presence of water. In order to effectively exert its function, a consolidating/protective agent must then primarily markedly reduce the extent and rate of penetration of water into the interior of the material to be protected. On the other hand one must prevent that the protective layer, while exerting said action, simultaneous induce collateral decay phenomena or however undesirable secondary effects. The essential characteristics of a good consolidating/protective agent can therefore by summarized as follows:

1. Ability to restore the cohesion between the particles of the surface layer of the decayed material and the underlying integral part.
2. Exhibiting an adequate mechanical strength of the so consolidated surface layer.
3. Retaining characteristics of elasticity within the consolidated surface layer in order to prevent the formation of a stiff surface layer having mechanical characteristics different from the substrate.
4. Chemical inertia toward the material to be protected and consolidated.
5. Low volatility.
6. Stability toward the action of atmospheric agents, of light and of heat.
7. Not altering the chromaticity of the material.
8. Preserving for a long time its solubility characteristics in order to assure the reversibility of the treatment.
9. Maintaining a sufficient permeability of the treated surface to air and water vapor, in order to prevent alteration phenomena underneath the impermeable film, due to condensed water within the interior of the same materials.

It is known the use of perfluoropolyethers as protective agents for manufactured articles in stone and concrete, as described for example in U.S. Pat. Nos. 4,499,146 and 4,745,009. Said products, while solving the problem of protection, do not however exert a consolidating function due to their liquid nature. A consolidating action has been achieved by using polymers based on vinylidene fluoride, which effectively exert both a protective function and mainly a consolidating action. As described in U.S. Pat. No. 4,764,431, this result is obtained by applying on the material to be protected and consolidated a solution in volatile solvents of a polymer based on vinylidene fluoride, preferably copolymerized with hexafluoropropene.

The Applicant, in a copending application, Italian Application No. 21613 A/90, filed in the U.S.A. on the same day of the present application, and incorporated herein by reference, has found that the application of a composition, formed of (a) a fluoroelastomer based on vinylidene fluoride and (b) a non elastomeric (co)polymer based on polyvinylidene fluoride or a polyalkylmethacrylate, provides for superior performance in terms of both protection and consolidation compared to the performance achievable by using the fluoroelastomer alone in solution.

THE PRESENT INVENTION

The problem solved by the present invention is to provide a system not using a dilute solution as above described, in order to avoid the use of large quantities of protection agent and all the difficulties in obtaining a homogeneous polymeric film.

The Applicant has unexpectedly found that it is possible to overcome the drawbacks of the better solution of the prior art, i.e. the systems described in the above cited copending application which are based on solutions of a composition of fluoroelastomers and of a non-elastomeric polymer, e.g. polyalkylmethacrylates or VDF-based (co)polymers, if a polymeric reversible gel based on the same above composition is used.

It is an object of the present invention to improve stone-protection and consolidation by using a treating system showing better characteristics with respect to non-gel systems, based on the same polymers already used in this field.

The reversible polymer gel of the present invention is formed of:

(a) 55–98% by weight of an elastomeric copolymer of vinylidene fluoride comprising, in moles, 55–85% of vinylidene fluoride (VDF), 15–45% of hexafluoropropene (HFP) and 0–30% of tetrafluoroethylene (TFE);

(b) 2–45% of a non-elastomeric polymer selected from a non-elastomeric VDF based (co)polymer, or polyvinylfluoride (PVF), or acrylic resins, for example polyalkylmethacrylates and copolymers of alkylmethacrylates with alkylacrylates, having $T_g > 50°$ C.

The weight percentages of (a) and (b) are calculated based on the total content of polymer components, excluding the solvent.

In component b), they are preferred non-elastomeric VDF-based (co)polymers containing 65% by moles of VDF, TFE in an amount of at most 35%, HFP in at most 5% by moles.

Preferred VDF copolymers are those having a melting point greater than 100° C., preferably greater than 120° C.

The Applicant has surprisingly found that the particular elastomeric copolymers of vinylidene fluoride (a) in the presence of appropriate non-elastomeric polymers (b) give rise to reversible gels.

The gels are prepared by a process in which, first, a solution of the elastomeric copolymer of VDF (a) and a solution of the non-elastomeric polymer (b) are separately prepared, then the two separated solutions are homogeneously mixed and kept in quiescent conditions or under moderate stirring until the gelation is obtained.

Gel formation becomes evident as the viscosity increases 10–10,000 times with respect to the starting solutions. In general, 10,000 times with respect to the starting solutions. In general, the gelation time ranges from about five to about thirty days. The gelation period may vary outside this range, depending on the chemical nature of polymers in the mixture or on the solvents used.

The total concentration of fluoroelastomers in the mixture, based on the dry ingredients, is generally comprised between 1 and 20 grams per 100 ml of solvent, preferably between 2 and 10.

The greater is the total polymer concentration and the lower the ratio of elastomeric/non-elastomeric component, the shorter is the gelation time and the larger is the viscosity of the obtained gel.

The threedimensional structure of the thus obtained gels can be easily destroyed, e.g. by heating; the reversibility is therefore assured.

In a preferred embodiment, the non-elastomeric polymer (b) is present in amounts of 2.30% by weight, more preferably 2–15% by weight, based on the total polymer content. Low concentrations of the non-elastomeric polymer are generally preferred when, in particular applications, a more rapid solvent evaporation is required.

Preferred polyalkylmethacrylates and copolymers thereof wit alkylacrylates are those wherein the alkyl group contains from 1 to 4 carbon atoms.

Particularly preferred are the polymethylmethacrylate and copolymers thereof with ethylacrylate.

Elastomeric copolymers of VDF are widely known in the art, see, for instance, Kirk-Othmer, "Encyclopaedia of Chemical Technology", vol. 8, pp. 500 et seq. (1979 Edn.). These copolymers are unvulcanized fluoroelastomers, available on the market under various commercial names (TECNOFLON ®; VITON ®; FLUOREL ®; DAIEL ®). Preferred among said fluoroelastomers are those having high molecular weight, e.g. having $\overline{M}_n \geq 10^5$, such as TECNOFLON NH ® and TECNOFLON TN ®. Copolymers having $\overline{M}_n$ comprised between $1.5 \times 10^5$ and $3.5 \times 10^5$ are particularly preferred.

Solvents commonly employed for VDF-based fluoroelastomers are selected from carboxylic esters, e.g. $C_1$–$C_4$ alkyl formiates and acetates, ketones, e.g. acetone, methylethylketone (MEK), ethers, e.g. tetrahydrofurane, methylterbutylether.

The VDF based (co)polymers which can be used as component (b) are for example homopolymers having a high molecular weight, e.g. KYNAR ® ($\overline{M}_n \geq 10^5$), which is soluble in solvents such as cyclohexanone, pinacolone, methyethylketone, or mixtures thereof. Another type of PVDF useful in the practice of the present invention is a low molecular weight PVDF ($\overline{M}_n$ of 2,000–6,000), prepared according to U.S. Pat. No. 4,739,024 and soluble in low boiling solvents, such as methyl acetate, ethyl acetate, acetone, methylethylketone, which allow for a more rapid drying of the treated surface.

As component b), they can also be used commercial products such as KYNAR SL ® and KYNAR FLEX 2800 ®, preferably dissolved in MEK. The gelification can be accelerated by adding to the solution from 5 to 50% by weight, preferably 0–30%, of an aliphatic hydrocarbon having a boiling point of 40°–130° C., for example hexane, octane, ligroin.

With regard to PVF, a low molecular weight polymer prepared analogously to the above mentioned method in U.S. Pat. No. 4,739,024 can be used, in alternative to commercial products.

Concerning solvent selection, the same indications apply as provided above for PVDF.

Polyalkylmethacrylates, wherein the alkyl group contains from 1 to 4 carbon atoms, are products commonly available on the market under various commercial names, for example DIAKON ® for polymethymethacrylate, and ELVACITE ® 2046 for butylacrylate. The acrylic resins of b) must have a Tg > 50° C.

Said polyalkylmethacrylates are soluble in particular in chlorinated solvents (e.g. chloroform and trichloroethylene), ketones (a.g. acetone), aromatic hydrocarbons (e.g. toluene), carboxylic esters (e.g. ethyl acetate), cyclic ethers (e.g. tetrahydrofurane).

The production of said gels assures remarkable advantages in practical applications, especially in areas wherein a drastic reduction of penetration of external agents into the material is required for an improved preservation of the initial properties.

As previously said, an important application concerns in fact the protection and consolidation of stone materials.

The use of reversible gels based on the compositions of the present invention offers superior protective and consolidating performance compared to the performance provided by protective treatments known in the art and compared to the performance obtained in accordance with the above cited copending patent application in the name of the Applicant.

The application of the gels onto the material to be protected can be carried out, for instance, by brushing, immersion, coating or spraying methods.

The amount of solid product to be applied varies depending on the extent and type of porosity of the substrate and is generally comprised between 1 and 50 $g/m^2$, preferably between 2 and 30 $g/m^2$. In any case the amount necessary for the protection is less than those required in comparable conditions as indicated in the above copending application.

Gels according to the present invention can also be advantageously utilized in sectors where the application of an insulating and impermeable fluoropolymeric film is required, e.g. for coating of metallic wires, in particular copper wires, with a polymeric layer obtained by immersion of the wires in the polymeric gel, or for coating of surfaces by brushing methods, roll-coating or spread-coating, e.g. by using spreading blades, where films of low fluidity are required. Metallic plates or foils can be coated with said method, for protection and/or insulation purposes in high temperature applications.

Advantages deriving from the use of gels in the preparation of thin films are independent of the substrate to be treated.

Obtained films are easy to handle even in the presence of large quantities of solvent. In fact, the formation of a homogeneous polymeric film onto the substrate is easier, and the film is formed before the total evaporation of the solvent. This allows for obtaining much thinner films than those produced starting from solutions of the polymers.

An additional use of the gels according to the present invention concerns the impregnation of textiles made of natural, artificial or synthetic fibers, and of glass fiber textiles, in order to achieve a water repellent effect.

The following examples are reported to provide for a better understanding of the possible embodiments of the present invention, and have a merely illustrative and non limitative purpose.

EXAMPLES 1-15

The following solutions were prepared to obtain a reversible gel:
a) TECNOFLON NH ® (fluoroelastomer by Montefluos having, in moles, 79% VDF and 21% HFP and having $\overline{M}_n = 2 \times 10^5$ approximately) in methylethylketone (MEK);
b) KYNAR 301 ® (PVDF by pennwalt) in cyclohexanone (CEO).

The various concentrations, quantities and ratios are reported in Table I.

Said solutions were obtained by refluxing the polymer with the solvent in a 250 ml flask for a time period of about two hours.

These solutions were mixed at room temperature at a ratio MEK/CEO=1/1 and kept in sealed containers under quiescent conditions for time periods ranging from 5 to 30 days.

Gel formation became evident as the viscosity increased 10-10,000 times with respect to the starting solutions.

EXAMPLES 16-30

Gels were prepared as in the preceding examples 1-15, except for mixing the two solutions at a ratio MEK/CEO=3/1.

Concentrations, quantities and ratios of the two polymers were kept the same as for Examples 1-15 (Table II).

EXAMPLES 31-55

A concrete (CLS) was prepared having the following composition expressed in parts by weight:

| ordinary Portland Cement | 1 |
|---|---|
| water | 0.67 |
| sand (0-5 mm) | 2 |
| aggregates (5-20 mm) | 4.5 |

Cubic specimens (5×5×5 cm) were obtained from said CLS and aged for 28 days, kept in oven at 100° C. for 24 hours and then weighed.

The specimens were treated by brushing onto all of the faces the gels from Examples 1-30, and, for comparison, the corresponding solutions used within two hours from their preparation, when no gel is formed.

The specimens were left in the oven to evaporate the solvent until the weight remained constant, and were thereafter immersed for 120 hours in tap water at room temperature; the resulting weight increases are reported in Tables III and IV.

Each value of weight increase reported in Tables III and IV is the average of the results obtained from two equal specimens treated with the same protective agent.

The same test for resistance to water penetration, performed on two untreated specimens, showed a 21% average weight increase.

The protective effectiveness (E.P. %) could be therefrom calculated for each solution, according to the formula:

$$E.P. \% = \frac{A - B}{A} \times 100$$

where A is the % weight increase of the untreated specimen and B that of the treated specimen.

From the data reported in Tables III and IV, it results that E.P. % (at equal coating amount) is significantly improved when the polymers compositions are applied in the form of gels, compared to the same compositions applied in the form of solutions (comparison), and is improved even more compared to the use of the TECNOFLON NH ® fluoroelastomer alone.

It has been further observed that systems containing larger amounts of MEK relative to CEO provide a better protection, when used as reversible gel compositions compared their use in the form of solutions of polymers (comparison).

EXAMPLES 56 and 57

Cubic specimens (5×5×5 cm) were prepared from Lecce stone, a calcareous rock having high porosity (about 32%), and treated by brushing with the gels and the solutions (comparison) of Examples 6 and 8.

The consolidating effectiveness (E.A. %) was measured according to the method described in U.S. Pat. No. 4,764,431, which consists in measuring the specimen weight loss after abrasive treatment.

Untreated specimens gave a weight loss of 114 g/cm².

The E.A. % was calculated according to the formula:

$$E.P. \% = \frac{P - Q}{P} \times 100$$

where P and Q indicate the weight loss per unit surface of the untreated and treated specimen respectively.

Data reported in Table V clearly show the improvement in consolidating performance when the compositions are applied in the form of a gel rather than a solution (comparison) or, even more, compared to the case where the TECNOFLON NH ® fluoroelastomer is applied alone.

EXAMPLES 58-60

The following solutions were prepared as in Examples 1-30 (Table VI):
a) 5.76 g of TECNOFLON NM ® (fluoroelastomer by Montefluos having, in moles, 79% VDF and 21% HFP and having $\overline{M}_n = 5 \times 10^5$) in 100 ml of acetone;
b) 1.6 g of DIAKON MG ® (PMMA by I.C.I.) in 100 ml of chloroform.

Gels were obtained by keeping the solutions in sealed containers under quiescent conditions for 30 days.

EXAMPLES 61-63

Cubic specimens (5×5×5 cm) were prepared from Vicenza stone, biocalcarenite having porosity of about 30%, and treated by brushing with both the gels and the corresponding solutions (comparison) of Examples 58-60.

The protective effectiveness was determined on the thus obtained specimens using the method described in U.S. Pat. Nos. 4,499,146 and 4,764,431, which consists in measuring the quantity of absorbed water per unit surface of the material with a graduated micropipette connected to a water containing cylinder and applied to a face of the specimen.

Untreated specimen absorbed 1.23 g/cm² of water.

In a completely analogous manner as to the immersion method, the E.P. % was calculated according to the formula:

$$E.P.\% = \frac{Z-Y}{Y} \times 100$$

where Z and Y indicate the amount of water absorbed per $cm^2$ by the untreated and treated specimen respectively.

The thus obtained results are reported in Table VII.

It can be observed that also in this case improved E.P. % values are evident when the specimens are treated with the gels according to the present invention.

EXAMPLES 64–66

Cubic specimens (5×5×5 cm) were prepared from Lecce stone and treated by brushing with the gels and the corresponding solutions of Examples 58–60.

The consolidating effectiveness was determined on the thus obtained specimens according to the method already employed for Examples 61 and 62.

Untreated specimens gave a weight loss of 102 g/$cm^2$.

The thus obtained results, reported in Table VIII, show a trend which is analogous to the preceding Examples.

EXAMPLES 67–69

Copper wires of 0.5 mm diameter were immersed for 5 minutes in gels obtained from 70/30 elastomer/PVDF mixtures by weight, and thereafter suspended in a drying oven at 90° C. to evaporate the solvent.

The thicknesses of the polymeric coatings formed onto the copper wires, measured with a precision micrometer, are reported in Table IX.

EXAMPLE 70

A specimen (20×20 cm) made of PORCKER TEXTILES grade no. 116 (107 g/$cm^2$) glass fabric for electronic use was immersed for 5 seconds in a gel obtained from a 70/30 by weight elastomer/PVDF mixture at 20% of fluorinated polymer, and thereafter introduced in an oven at 90° C. to evaporate the solvent.

An impermeable fabric resulted, as from testing for penetration of water poured from a glass.

EXAMPLE 71 (Comparative)

A specimen made of glass fabric as in the preceding Example was immersed for 5 seconds in the starting solution for the gel used in Example 70.

After evaporating the solvent at 90° C., a polymer coating, as measured from the weight increase of the fabric, about 10 times smaller than in Example 70 was obtained.

Furthermore, the fabric was not water repellant, i.e. was reely penetrated by the water poured from a glass.

TABLE I

| | | MEK/CEO = 1/1 | | |
|---|---|---|---|---|
| Example | Total Concentration of Fluoropolymers (g/100 ml) | Elastomer:PVDF by weight | Viscosity of the Solution after 1 day (Pa · s) | Viscosity of the Gel after 10 days (Pa · s) |
| 1 | 10 | 100:0 | 39.3 | 65.2 |
| 2 | " | 95:5 | 49.2 | 312 |
| 3 | " | 90:10 | 56.8 | 5032 |
| 4 | " | 80:20 | 79.5 | 4776 |
| 5 | " | 70:30 | 98.7 | 5092 |
| 6 | 5 | 100:0 | 32.5 | 65.3 |
| 7 | " | 95:5 | 140 | 429 |
| 8 | " | 90:10 | 189 | 2433 |
| 9 | " | 80:20 | 138 | 4722 |
| 10 | " | 70:30 | 222 | 5143 |
| 11 | 2 | 100:0 | 26.1 | 40.6 |
| 12 | " | 95:5 | 53.8 | 565 |
| 13 | " | 90:10 | 61.3 | 510 |
| 14 | " | 80:20 | 104.5 | 606 |
| 15 | " | 70:30 | 111.1 | 570 |

TABLE II

| | | MEK/CEO = 3/1 | | |
|---|---|---|---|---|
| Example | Total Concentration of Fluoropolymers (g/100 ml) | Elastomer:PVDF by weight | Viscosity of the Solution after 1 day (Pa · s) | Viscosity of the Gel after 10 days (Pa · s) |
| 16 | 10 | 100:0 | 43.7 | 79.8 |
| 17 | " | 95:5 | 76.5 | 565 |
| 18 | " | 90:10 | 106.7 | 648 |
| 19 | " | 80:20 | 168.2 | 3225 |
| 20 | " | 70:30 | 219.9 | 5160 |
| 21 | 5 | 100:0 | 38.5 | 70.9 |
| 22 | " | 95:5 | 73.3 | 831 |
| 23 | " | 90:10 | 107.7 | 800 |
| 24 | " | 80:20 | 103.7 | 4067 |
| 25 | " | 70:30 | 121.6 | 4593 |
| 26 | 2 | 100:0 | 30.9 | 63.0 |
| 27 | " | 95:5 | 124.6 | 714 |
| 28 | " | 90:10 | 182.5 | 723 |
| 29 | " | 80:20 | 233.9 | 815 |
| 30 | " | 70:30 | 240.7 | 2164 |

TABLE III

| Example | Total Concentration of Fluoropolymers (g/100 ml) | Elastomer:PVDF by weight | Polymer of the Coating (g/m²) | GEL Weight Increase (%) | GEL E.P. (%) | SOLUTION (for comparison) Weight Increase (%) | SOLUTION (for comparison) E.P. (%) |
|---|---|---|---|---|---|---|---|
| 31 | 10 | 100:0 | 10 ± 0.4 | — | — | 15.1 | 25 |
| 32 | " | 95:5 | " | 9.1 | 55 | 12.2 | 39 |
| 33 | " | 90:10 | " | 9.0 | 55 | 12.3 | 39 |
| 34 | " | 80:20 | " | 5.3 | 75 | 6.7 | 67 |
| 35 | " | 70:30 | " | 4.5 | 78 | 5.8 | 71 |
| 36 | 5 | 100:0 | 6.5 ± 0.2 | — | — | 18.1 | 10 |
| 37 | " | 95:5 | " | 10.2 | 49 | 16.5 | 18 |
| 38 | " | 90:10 | " | 8.3 | 59 | 12.6 | 37 |
| 39 | " | 80:20 | " | 6.5 | 68 | 9.3 | 54 |
| 40 | " | 70:30 | " | 6.3 | 69 | 7.2 | 64 |
| 41 | 2 | 100:0 | 6.5 ± 0.2 | — | — | 18.2 | 9 |
| 42 | " | 95:5 | " | 10.1 | 50 | 18.0 | 10 |
| 43 | " | 90:10 | " | 7.5 | 63 | 13.3 | 34 |
| 44 | " | 80:20 | " | 7.1 | 65 | 12.9 | 36 |
| 45 | " | 70:30 | " | 7.0 | 65 | 12.5 | 38 |

TABLE IV

| Example | Total Concentration of Fluoropolymers (g/100 ml) | Elastomer:PVDF by weight | Polymer of the Coating (g/m²) | GEL Weight Increase (%) | GEL E.P. (%) | SOLUTION (for comparison) Weight Increase (%) | SOLUTION (for comparison) E.P. (%) |
|---|---|---|---|---|---|---|---|
| 46 | 2 | 100:0 | 6.5 ± 0.2 | — | — | 14.5 | 28 |
| 47 | " | 95:5 | " | 9.2 | 54 | 13.9 | 31 |
| 48 | " | 90:10 | " | 6.1 | 70 | 8.7 | 57 |
| 49 | " | 80:20 | " | 4.3 | 79 | 6.3 | 69 |
| 50 | " | 70:30 | " | 3.7 | 82 | 3.9 | 81 |
| 51 | 2 | 100:0 | 6.5 ± 0.2 | — | — | 16.1 | 20 |
| 52 | " | 95:5 | " | 9.8 | 51 | 15.0 | 25 |
| 53 | " | 90:10 | " | 7.4 | 63 | 11.9 | 41 |
| 53 | " | 80:20 | " | 6.1 | 70 | 9.5 | 53 |
| 55 | " | 70:30 | " | 3.7 | 82 | 4.7 | 77 |

TABLE V

| Example | Total Concentration of Fluoropolymers (g/100 ml) | Elastomer:PVDF by weight | Polymer of the Coating (g/m²) | GEL Weight Loss (%) | GEL E.A. (%) | SOLUTION (for comparison) Weight Loss (%) | SOLUTION (for comparison) E.A. (%) |
|---|---|---|---|---|---|---|---|
| 56 | 5 | 100:0 | 60 | — | — | 61 | 46 |
| 57 | " | 90:10 | " | 39 | 66 | 48 | 58 |

TABLE VI

MEK/CEO = 1/1

| Example | Total Concentration of Fluoropolymers (g/100 ml) | Elastomer:PMMA by weight | Weight of TECHNOFLON in 100 ml Acetone | Weight of PMMA in 100 ml Chloroform | Viscosity of Solution after 1 day (Pa · s) | Viscosity of Gel after 10 days (Pa · s) |
|---|---|---|---|---|---|---|
| 58 | 10 | 100:0 | 10.0 | — | 39.3 | 65.2 |
| 59 | " | 90:10 | 9.0 | 1.0 | 64.9 | 3200 |
| 60 | " | 80:20 | 8.0 | 2.0 | 83.4 | 5680 |

TABLE VII

| Example | Total Concentration of Fluoropolymers (g/100 ml) | Elastomer:PVDF by weight | Polymer of the Coating (g/m²) | GEL Absorbed Water (g/cm²) | GEL E.P. (%) | SOLUTION (for comparison) Absorbed Water (g/cm³) | SOLUTION (for comparison) E.P. (%) |
|---|---|---|---|---|---|---|---|
| 61 | 10 | 100:0 | 30 | — | — | 0.71 | 42 |
| 62 | " | 90:10 | " | 0.38 | 69 | 0.53 | 57 |
| 63 | " | 80:20 | " | 0.35 | 71 | 0.50 | 59 |

TABLE VIII

| Example | Total Concentration of Fluoropolymers (g/100 ml) | Elastomer:PVDF by weight | Polymer of the Coating (g/m²) | GELS | | SOLUTION (for comparison) | |
|---|---|---|---|---|---|---|---|
| | | | | Weight Loss (%) | E.A. (%) | Weight Loss (%) | E.A. (%) |
| 64 | 20 | 100:0 | 50 | — | — | 63 | 38 |
| 65 | " | 90:10 | " | 41 | 60 | 52 | 49 |
| 66 | " | 80:20 | " | 40 | 61 | 51 | 50 |

TABLE IX

| Example | Composition of the GEL (%) | Coating Thickness (μ) |
|---|---|---|
| 67 | 5 | 1.8 |
| 68 | 10 | 4.3 |
| 69 | 20 | 10.1 |

What is claimed is:

1. A reversible polymeric gel, comprising the following polymers:
   (a) 55–98% by weight of an elastomeric copolymer of vinylidene fluoride formed of, in moles, 55–85% of vinylidene fluoride, 15–45% of hexafluoropropene and 0–30% of tetrafluoroethylene;
   (b) 2–45% by weight of a non-elastomeric polymer selected from the group consisting of non-elastomeric vinylidene fluoride-based copolymers, polyvinylfluoride, and acrylic resins, said acrylic resins having $T_g \geq 50°$ C.,
wherein the viscosity of the reversible polymeric gel is 10–10,000 times as great as the viscosity of a solution containing the polymer components in (a) and a solution containing the polymer components in (b).

2. The reversible polymeric gel of claim 1, wherein said non-elastomeric polymer (b) is present in amounts of 2–30% by weight.

3. The reversible polymeric gel of claim 2, wherein said non-elastomeric polymer (b) is present in amounts of 2–15% by weight.

4. The reversible polymeric gel of claim 1, wherein said non-elastomeric polymer is a polyalkylmethacrylate or a copolymer of an alkylacrylate with an alkylmethacrylate wherein the alkyl group contains from 1 to 4 carbon atoms.

5. The reversible polymeric gel of claim 4, wherein said polyalkylmethacrylate is polymethylmethacrylate.

6. A process for preparing the reversible polymeric gel of claim 1, said process comprising the following steps:
   (a) mixing a starting solution of an elastomeric copolymer of vinylidene fluoride, with a starting solution of a non-elastomeric polymer, said elastomeric copolymer of vinylidene fluoride being formed of, in moles, 55–85% of vinylidene fluoride, 15–45% of hexafluoropropene, and 0–30% of tetrafluoroethylene, and said non-elastomeric polymer being selected from the group consisting of non-elastomeric vinylidene fluoride-based copolymers, polyvinyl-fluoride, and acrylic resins, said acrylic resins having $T_g > 50°$ C.; and
   (b) maintaining the mixture from step (a) under quiescent conditions until the viscosity of said mixture is 10–10,000 times as great as the viscosity of the starting solution of the elastomeric copolymer of vinylidene fluoride, and of the starting solution of the non-elastomeric polymer.

7. An article of manufacture, wherein said article of manufacture is coated with the reversible polymeric gel of claim 1, said article being selected from the group consisting of metallic films, plates, foils and wires.

8. An article of manufacture, wherein said article of manufacture is a water-repellent fabric impregnated with the reversible polymeric gel of claim 1, and wherein said fabric is selected from the group consisting of natural fiber, synthetic fiber and glass fiber textiles.

* * * * *